March 12, 1968 M. J. SAAREM 3,373,255
METHOD OF SENSING LOSS OF GASEOUS MASS AND
PRESSURE-SENSITIVE SWITCH THEREFOR
Filed June 22, 1966 2 Sheets-Sheet 2
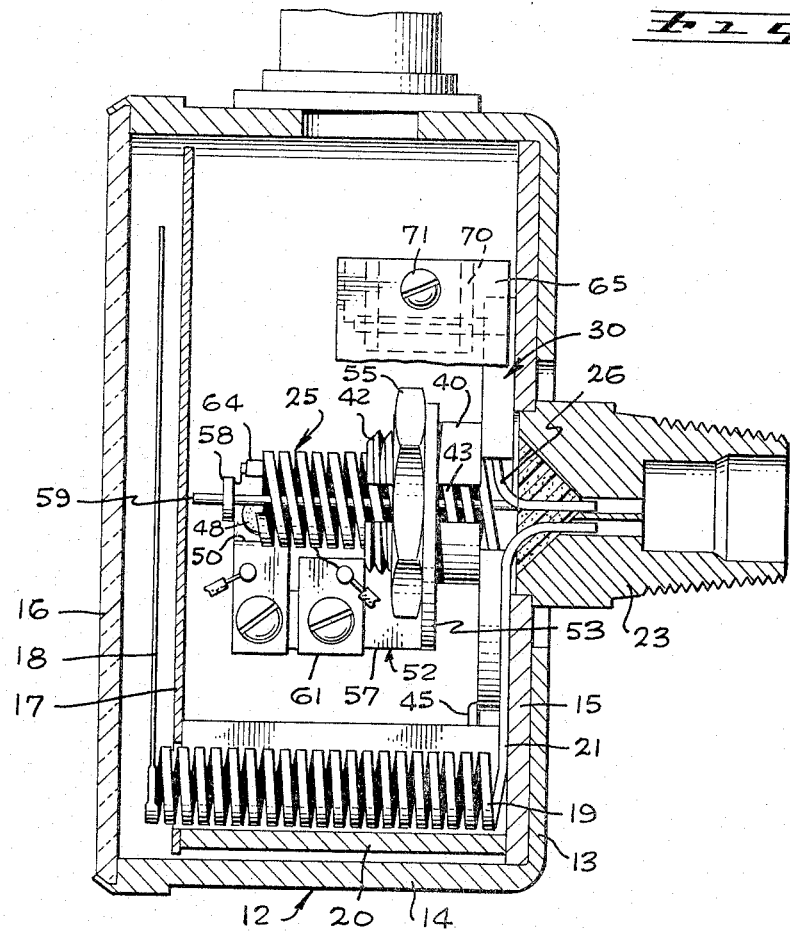
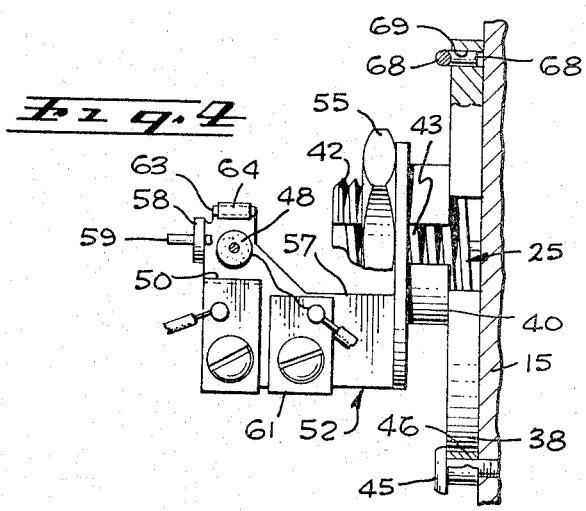
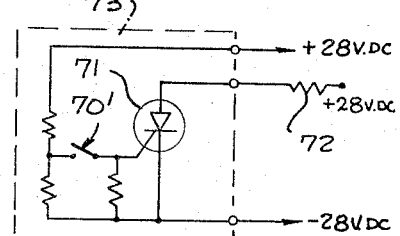
INVENTOR.
MYRL J. SAAREM
BY
ATTORNEYS

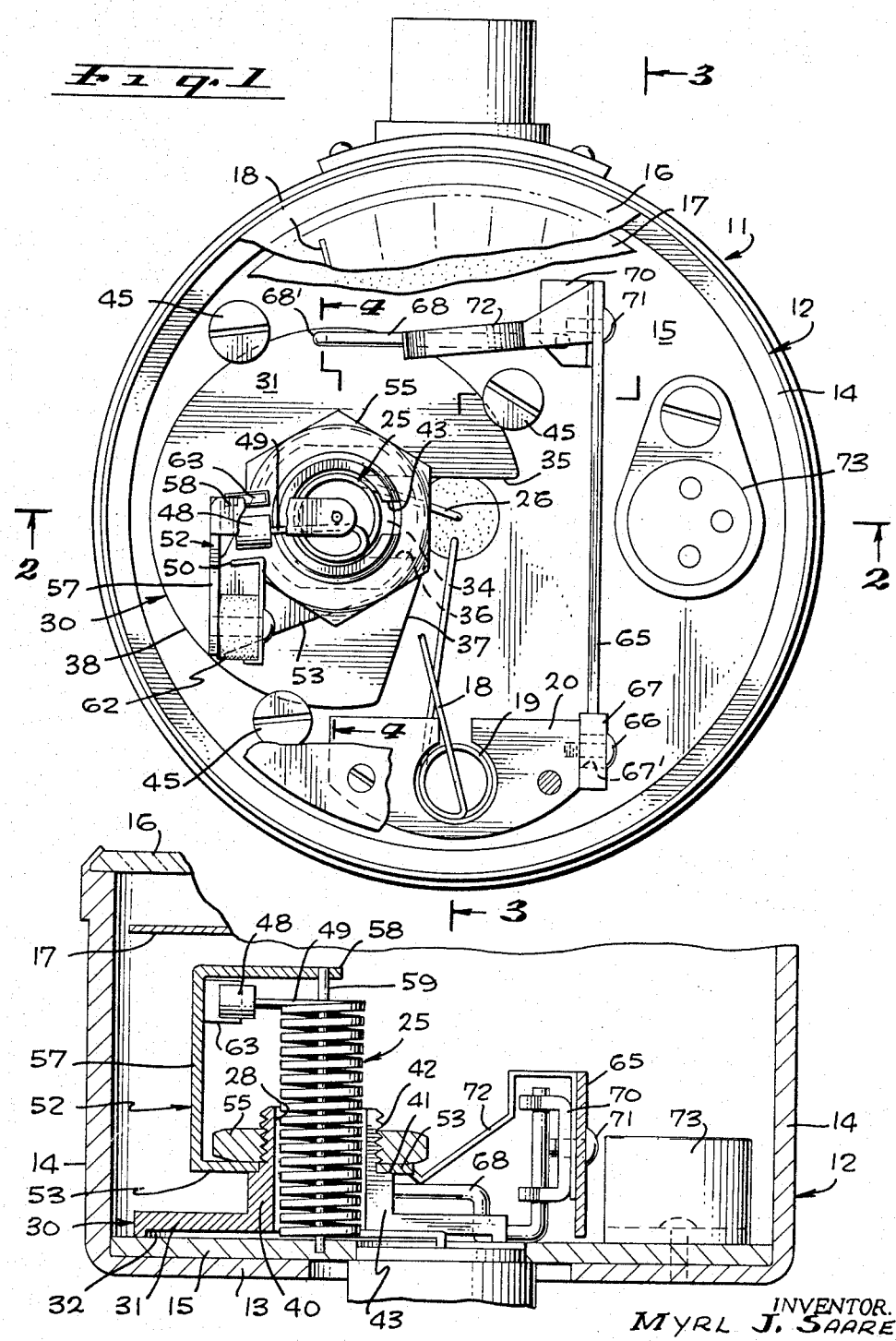

United States Patent Office 3,373,255
Patented Mar. 12, 1968

3,373,255
METHOD OF SENSING LOSS OF GASEOUS MASS AND PRESSURE-SENSITIVE SWITCH THEREFOR
Myrl J. Saarem, North Hollywood, Calif., assignor to Roylyn Incorporated, Glendale, Calif., a corporation of California
Filed June 22, 1966, Ser. No. 559,568
5 Claims. (Cl. 200—140)

ABSTRACT OF THE DISCLOSURE

The application discloses a pressure-sensitive switch utilizing a Bourdon tube to sense pressure and actuate a movable switch contact and a thermal responsive means for adjusting the switch gap.

---

This invention has to do in a general way with a method and means for sensing loss of mass in a container holding a supply of gas under pressure and more particularly has to do with pressure-sensitive switches.

An object of the invention is to provide a novel method and apparatus for sensing loss of mass in a container holding a supply of gas in which a large portion thereof is liquefied and providing a sensible indication of the loss.

Another object is to provide a new and improved pressure-sensitive switch in which a Bourdon tube is used to operate the switch contacts.

More particularly it is an object to provide a temperature-compensated Bourdon tube-actuated switch in which the pressure required in the tube to operate the switch is automatically adjusted or varied in accordance with ambient temperature whereby the switch can be used to monitor a pressure vessel or container holding a supply of gas and will function to close in accordance with a predetermined temperature-pressure curve.

Another object is to provide a pressure-sensitive switch which is particularly adaptable for incorporation into solid state circuitry and to provide a novel sensing circuit means.

These and other objects will be apparent from the drawings and the following description. Referring to the drawings:

FIG. 1 is a face view, partly broken away, of a combined pressure gauge and pressure-sensitive switch embodying the invention;

FIG. 2 is a fragmentary cross section on line 2—2 of FIG. 1;

FIG. 3 is a cross section on line 3—3 of FIG. 1;

FIG. 4 is a fragmentary sectional view on line 4—4 of FIG. 1, but on a larger scale; and FIG. 5 is a schematic view of a switching circuit utilizing a switch of a type embodying the invention.

More particularly describing the invention, in the drawings I show a typical installation for my temperature-compensated switch in which it is a part of a combined gauge and switch, designated generally by numeral 11. This includes a case 12 which has an outer rear wall 13, a continuous side wall 14, an inner rear wall 15, and a transparent lens 16. The particular instrument shown has a dial plate 17 and a pointer 18 associated therewith which is connected to the free end of a Bourdon tube 19. The latter is mounted in a guide block 20 within the casing and has an extension 21 at its inner end which terminates and is sealed in a fitting 23 mounted in the wall 15. The gauge elements thus far described form no part of the invention.

Within the case 12 I provide a second Bourdon tube, designated 25, which forms part of the switch means embodying the invention to be described. The tube 25 is supported in the casing on an extension 26 of the tube which is sealed into the fitting 23. About half the length of the tube is freely received in a bore 28 of a rotary support or pedestal 30 that serves to partially support the tube against shock and vibration without restricting its turning movement under influence of pressure changes within it.

The pedestal comprises a flat base portion 31 with a recessed undersurface 32. The base portion is generally circular in outline throughout about 270°. The remainder of it is formed to provide a slot 34 defined by a straight long edge 35 on one side and a straight short edge 36 on the other. The latter merges with an outer edge section 37 that joins the circular edge 38. A tubular section 40, with the aforementioned bore 28, is formed integral with the base portion and has a shoulder 41 and beyond that a threaded portion 42 of reduced diameter. The section is longitudinally slotted at 43.

Pedestal 30 is adapted to rotate on the wall 15 of the case and for this purpose is rotatably held by three screws 45 mounted in wall 15 which are spaced circumferentially around the circular portion of the base of the pedestal and carry bearings 46.

The Bourdon tube 25 carries a switch contact 48 on the end of its free end portion 49 and this is adapted, under certain conditions, to be moved into engagement with a stationary electrical contact 50. The latter is carried on a bracket 52 which is mounted on the pedestal 30. The bracket includes an apertured base 53 which fits over section 42 of the pedestal and is retained by a nut 55. It further includes a portion 57 extending normally from the base at one side thereof and a guide finger 58 extending from the portion 57 and disposed parallel to the base. The latter section is apertured to receive freely a stationary stabilizing shaft 59 mounted in wall 15 and extending on the axis of the tube 25. Wall 57 carries a terminal lug 61 and the aforementioned stationary switch contact 50 which is mounted upon a block 62 of electrical insulation material. The bracket also carries an ear 63 behind the movable switch contact 48 and this is covered with electrical insulation 64, the ear serving to limit movement of the switch contact 48 away from contact 52.

As previously pointed out, one of the features of the invention is the fact that the switch is temperature-compensated and this is accomplished by moving the stationary contact with reference to the Bourdon tube in accordance with ambient temperature. For this purpose I provide a bimetallic strip 65 which is adjustably mounted at one end on block 20 by means of screws 66 which extend through a clip 67 having slots 67' therefor. The free end of the strip is connected to the pedestal by a connecting rod 68, end 68' of which is received in a hole 69 in the pedestal. The other end of the connecting rod is rotatably received in a U-bracket 70 that is attached by a screw 71 to the end of the strip. A vibration and shock-damping spring 72 is included in the assembly and bears upon the connecting rod, being mounted with the bracket.

In the operation of the device thus far described it will be apparent that the location of the stationary contact 50 varies, depending upon the ambient temperature, and that therefore the switch will close at different pressures, depending upon the ambient temperature. Consequently it is possible to correlate the values of the components in accordance with a predetermined or desired pressure-temperature curve so that the switch will close within known limits along such a curve.

The switch is particularly suitable for incorporation into solid state circuitry and, by way of example, in FIG. 5 I show a switching circuit in which the switch 70', representing the switch heretofore described, is used to close the low voltage, low current gate circuit of a silicon-controlled rectifier 71 and thereby effect flow of current in the main circuit which can be used to energize a warning lamp or other load 72. The components of the switching circuit may be mounted in a suitable housing 73 provided in the case 12. Part 74 is an electrical connector.

With the arrangement shown, although the Bourdon tube-operated switch is a slow-moving one, the normally inherent problems of such a switch are eliminated because the voltage and current are low and because, once the gate circuit is energized, the transistor 71 conducts and will continue to do so, eliminating any lamp flicker where a warning lamp comprises the load.

Although I have illustrated and described a preferred form of my invention, I contemplate that various changes and modifications can be made therein without departing from the invention, the scope of which is indicated by the following claims. By way of example, the switch has been shown and described as one which closes when the pressure in the Bourdon tube diminishes and opens or remains open when the pressure is relatively high, however, the switch may be designed to operate to close when the pressure increases and open or remain open when the pressure is relatively low.

I claim:

1. In a temperature-compensated pressure-sensitive electrical switch device, a support, a pedestal on the support mounted for rotary movement relative thereto, a helical Bourdon tube mounted at one end on the support and adapted at said one end for connection to a conduit leading to a pressure vessel or the like, a first switch contact carried by the free end of the tube, a second switch contact carried by said pedestal in the path of movement of said first switch contact, a temperature-sensitive bimetallic strip connected between said pedestal and said support to move said pedestal in response to changes in ambient temperature.

2. A temperature-compensated, pressure-sensing electrical switch device, comprising a case, a pedestal mounted for limited rotary movement in said case, a helical Bourdon tube mounted in the case having a closed free end and with its axis on the axis of rotation of the pedestal, a first switch contact carried by the free end of said Bourdon tube, a second switch contact carried by said pedestal in the path of movement of said first switch contact, and a temperature-sensitive means in the case operably connected to rotate said pedestal and the second switch contact carried thereby in response to changes in temperature.

3. The device set forth in claim 2 in which said temperature-sensitive means comprises a bimetallic strip mounted at one end in the case and connected at its other end to said pedestal.

4. The device set forth in claim 1 in which said bimetallic strip is mounted at one end on said support and in which connecting rod extends between the other end of the strip and said pedestal.

5. The device set forth in claim 4 in which a vibration and shock damper is provided on the bimetallic strip and operably engages said connecting rod.

References Cited

UNITED STATES PATENTS

| | | | |
|---|---|---|---|
| 1,246,270 | 11/1917 | Huffman | 200—81 |
| 1,720,901 | 7/1929 | Ileman. | |
| 2,058,256 | 10/1936 | Pike | 200—81.8 |
| 2,736,191 | 2/1956 | Bockelmann et al. | 73—393 |
| 2,835,130 | 5/1958 | Kachline | 200—81.3 X |
| 2,957,072 | 10/1960 | Rigel | 200—167 |
| 3,004,434 | 10/1961 | Heise | 73—393 X |
| 3,120,843 | 2/1964 | Hyman | 307—118 X |
| 3,287,576 | 11/1966 | Motto | 307—88.5 |
| 2,067,959 | 1/1937 | Wasson | 200—140.1 |
| 3,276,260 | 10/1966 | Weiler | 200—140 XR |

FOREIGN PATENTS

| | | |
|---|---|---|
| 1,204,567 | 8/1959 | France. |

BERNARD A. GILHEANY, *Primary Examiner.*

H. B. GILSON, *Assistant Examiner.*